United States Patent [19]

Kehl

[11] Patent Number: 4,507,645

[45] Date of Patent: Mar. 26, 1985

[54] ASSEMBLY FOR THE TRANSMISSION OF CONTROL SIGNALS TO AND/OR FROM MOBILE EQUIPMENT

[75] Inventor: Rainer Kehl, Erlangen, Fed. Rep. of Germany

[73] Assignee: Siemens Aktiengesellschaft, Berlin and Munich, Fed. Rep. of Germany

[21] Appl. No.: 520,145

[22] Filed: Aug. 4, 1983

[30] Foreign Application Priority Data

Mar. 25, 1983 [DE] Fed. Rep. of Germany ....... 3311010

[51] Int. Cl.[3] .......................................... H04M 11/04
[52] U.S. Cl. .................. 340/310 A; 455/603
[58] Field of Search ......................... 307/10 LS, 10 R; 340/310 R, 340 A, 825.23, 825.63, 825.72, 870.28, 870.29; 350/96.11, 96.16, 96.23; 455/603, 612, 617

[56] References Cited

U.S. PATENT DOCUMENTS

| 4,306,314 | 12/1981 | Griffiths | 455/603 |
|---|---|---|---|
| 4,379,615 | 4/1983 | Toda | 350/96.23 |
| 4,413,250 | 11/1983 | Porter | 340/310 A |
| 4,434,510 | 2/1984 | Lemelson | 455/603 |

FOREIGN PATENT DOCUMENTS

| 2035599 | 11/1978 | United Kingdom . | |
|---|---|---|---|
| 2079558 | 6/1980 | United Kingdom | 455/612 |

OTHER PUBLICATIONS

McMahon et al., "Fiber-Optic Transducers," *IEEE Spectrum*, Dec., 1981, pp. 24–29.

*Primary Examiner*—James J. Groody
*Assistant Examiner*—Michael F. Heim
*Attorney, Agent, or Firm*—Kenyon & Kenyon

[57] ABSTRACT

In an electromechanical machine such as a crane having a movable working component and a drum rotatably secured thereto for taking up slack and controlling the tension in an electrical power supply cable extending from a stationary component to the movable component, an assembly for transmitting control signals between the machine components includes a pair of electro-optical transducers and an optical fiber extending therebetween. The optical fiber is encased in the cable sheath and engages the transducers at either end. One transducer is mounted on the drum and is electrically coupled to a slip ring integral with the drum.

6 Claims, 2 Drawing Figures

ASSEMBLY FOR THE TRANSMISSION OF CONTROL SIGNALS TO AND/OR FROM MOBILE EQUIPMENT

BACKGROUND OF THE INVENTION

This invention relates to an assembly for transmitting control signals to and/or from a mobile component of an electromechanical machine such as a crane or bulk material handling equipment.

For supplying power to movable cranes or to the mobile parts of bulk material handling equipment such as dredges or stacker/recliners, electric cables are used which can be wound on and unwound from one or several cable drums. The cable drums are provided with slip rings for facilitating or enabling power transfer from the cables on the drums to electric equipment on the mobile machine. For the cables carrying the control signals additional cable drums are usually employed. Other possibilities, already realized, for carrying control signals to the mobile machines involve inductive transmission and transmission via radio links. Disadvantages of the known types of transmission are, for instance, the voltage drop in electric control lines, the limited transmission rates at serial interfaces and capacitive and inductive interferences. The transmission of control signals to mobile machines has required large expenditures.

For transmitting signals between relatively movable parts, particularly relatively rotatable parts, some transmission assemblies include a light guide which, at the transition from the stationary to the movable part, has a separation or gap which must be bridged by the light signal. Transmission of light signals across the gap from an end of the optical fiber connected to the rotatable machine part to an end of the stationary optical fiber presents difficulties requiring expensive designs for a proper transmission of the light signals.

Lines or cables with integrated optical fibers are known, for instance, from British Pat. No. GB-A-20 35 599.

An object of the present invention is to provide a simple assembly for transmitting without interference electrical control signals to a mobile machine component of an electromechanical device such as a crane or bulk material handling equipment, to which device electrical power is carried by a cable windable about a cable drum.

SUMMARY OF THE INVENTION

An assembly for transmitting control signals between a movable machine component and a stationary component comprises, in accordance with this invention, a first signal transformer or electro-optical transducer for converting into an optical or light-frequency signal an electrical information-bearing signal generated by a control unit or a sensor mounted on the machine or stationary components. The optical signal is carried from the first electro-optical transducer to a second signal transformer or electro-optical transducer by an optical fiber which is encased in the insulating sheath of the electrical power supply cable, this cable being windable about a cable-slack take-up drum rotatably mounted to the machine components. The optical fiber is connected to or engages the electro-optical transducers at either end. The second transducer serves to reconvert the optical signals to electrical signals which are then transmitted to a control element acting at least partially in response to the information coded in the electrical signals. One of the transducers is secured to the cable drum and is electrically or operatively connected to a slip ring fixed to the drum. Electrical signals are transmitted between that transducer and either the signal generator or the signal receiver, i.e., the control element, by means of the slip ring and an electrically conductive brush slidingly engaging the slip ring.

By utilizing a single cable for supply and control purposes, the expense of separate electric control lines and an additional cable drum or of an inductive transmission channel or a radio link is eliminated. Since the optical fiber, which is brought through the hollow shaft of the cable drum, and the electro-optical transducer arranged on or near the slip ring rotate together with the cable drum, the optical fiber can be connected permanently to the optical input of the signal-receiving electro-optical transducer without the need of transmitting light over a gap. Trouble-free transmission of the light signals is thereby assured.

DETAILED DESCRIPTION

Figures 1, 2:
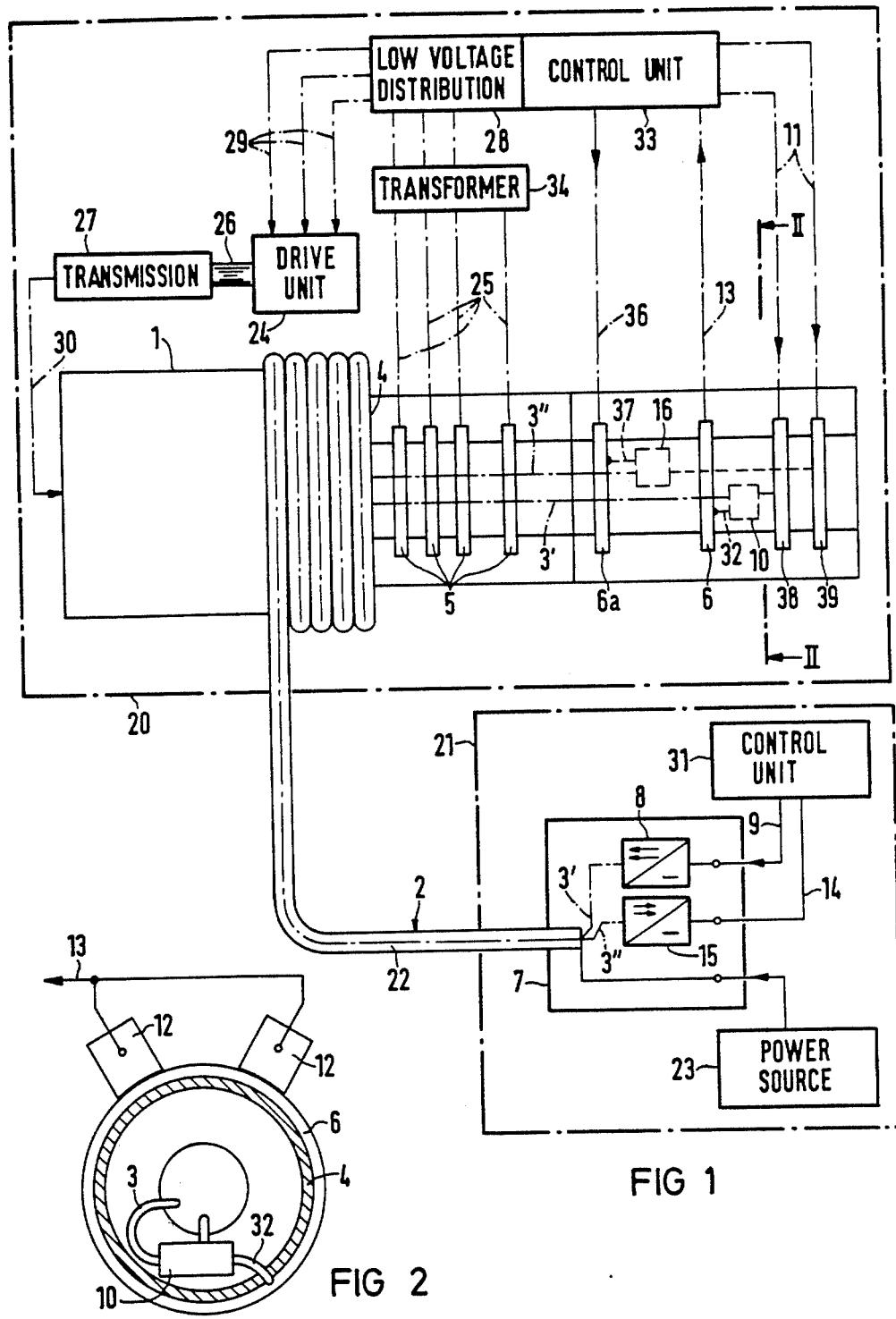
FIG. 1 is a diagram of an electromechanical machine havng a mobile working component and a stationary control component, showing an assembly in accordance with this invention for transmitting information-bearing signals between the machine and stationary components.
FIG. 2 is a partial cross-sectional view taken along line II—II in FIG. 1.

As illustrated in FIG. 1, an electromechanical apparatus such as a crane or bulk material handling equipment having a mobile working component 20 and a stationary control component 21 includes a drum 1 rotatably secured to mobile component 20 for taking up the slack in an electrical power cable 2.

Cable 2 extends from a feed point 7 on stationary component 21 and has a flexible insulating sheath 22. The cable transmits electrical power from a stationary power source 23 to a set of slip rings 5 integral with a hollow shaft 4 which supports drum 1. Slip rings 5 are operatively linked to a transformer 34 and/or voltage distribution 28 via non-illustrated brushes and schematically illustrated conductors 25. Electric motor 24 has an output or drive shaft 26 extending to a transmission 27. The transmission in turn drives and rotates shaft 4 and, consequently, cable-slack take-up drum 1 via a power train 30. When mobile component 20 is in motion, transmission 27 rotates drum 1 in a direction and at an angular speed corresponding to the direction and rate of motion of mobile component 20 with respect to stationary component 21, whereby cable 2 is let out or taken up with a minimum of stress and a minimum of slack.

A control unit 31 mounted to stationary component 21 generates electrical information-bearing control signals on a lead 9 extending to an electro-optical transducer 8 such as a laser diode or light-emitting gallium arsenide diode. Transducer 8 transforms or converts the electrical signals from control unit 31 into optical signals which are carried by an optical fiber 3' encased in cable sheath 22 from transducer 8 to an electro-optical transducer 10 such as an avalanche or pin diode mounted to drum 1 (or hollow support shaft 4). Optical fiber 3' has an input end which engages transducer 8 and an output end which engages transducer 10, as shown in FIG. 2. There are no gaps between the ends of the fiber 3 and transducer 8 and 10.

Transducer 10 is mounted to shaft 4 (and, therefore, to drum 1) proximately or direct to a slip ring 6 fastened to shaft 4. As shown in FIG. 2, transducer 10 is electrically coupled to slip ring 6 by means of a wire 32. Slip ring 6 in turn is operatively connected to a control unit 33 (see FIG. 1) via a lead 13 and a pair of electrically conductive brushes 12 slidingly engaging an edge or rim of slip ring 6.

Transducer 10 converts the optical signals arriving over fiber 3' back into electrical signals which are transmitted to control unit 33 via slip ring 6, brushes 12 and lead 13. In response to the incoming electrical signals, control unit 33 controls the direction of the mobile machine and controls the low voltage distribution 28 for the power output to the drive unit 24 over power trains 29.

The control unit 33 of the mobile component 20 has output leads 36 extending to a slip ring 6a integral with shaft 4 and drum 1 to transit information to the stationary control unit 31. Slip ring 6a is operatively tied via a wire 37 to an electro-optical transducer 16 such as a light-emitting gallium arsenide diode or a laser diode, this transducer being secured to shaft 5 in the vicinity of slip ring 6a or direct mounted on the slip ring 6a. In response to electrical information-bearing signals carried from control unit 33 via leads 36, nonillustrated brushes, slip ring 6a and wire 37, transducer 16 generates optical signals on an optical fiber 3" enclosed along a portion of its length by cable sheath 22. An input end of fiber 3" engages transducer 16, while an output end engages an electro-optical transducer 15 such as an avalanche diode or a pin diode mounted to stationary component 21 in the region of cable feed point 7. Transducer 15 converts incoming optical signals into electrical signals transmitted from transducer 15 to control unit 31 via a lead 14. The control signals produced by unit 31 on lead 9 are partially determined by signals received from control unit 33.

It is to be noted that since a large number of control signals, particularly digital control signals, can be transmitted via optical fibers 3' and 3" only a single optical fiber is necessary in many cases fo signal transmission in either direction between machine components 20 and 21. Receiving transducer 10 and transmitting transducer 16 are conductively linked to further slip rings 38 and 39, these slip rings being operatively coupled via leads 11 to nonillustrated power supply elements in the law voltage distribution 28, 20 via a multiple-lead connection 11.

What is claimed is:

1. In an electrochemical apparatus having a working mobile component, a controlling stationary component, a stationary power source, an electrical cable extending from the power source to the mobile component for feeding electrical power thereto and a drum rotatably mounted to one of said components for taking up slack in said cable, said cable being windable about said drum and having a flexible insulating sheath; an assembly for controlling said mobile component, comprising:

signal producing control means on the stationary component for generating electrical signals containing encoded information relating to the utilization of electric power in moving the mobile component;

power distribution means disposed on said mobile component and operatively connected to the electrical cable for distributing the power therefrom;

signal using control means disposed on said mobile component and operatively connected to said power distribution means for controlling the operation thereof in response to information coded in said electrical signals;

first signal transforming means including a first electro-optical transducer mounted on said stationary component and operatively connected to said signal producing control means for converting said electrical signals into optical signals;

second signal transforming means including a second electro-optical transducer for converting said optical signals back into electrical signals, said second signal transforming means being mounted on said mobile component and operatively coupled to said signal using control means;

optical transmission means including at least one optical fiber extending longitudinally through the insulating sheath of the electrical cable for carrying said optical signals from said first signal transforming means to said second signal transforming means, said optical fiber having an input end engaging said first electro-optical transducer and an output end engaging said second electro-optical transducer; and electrical transmission means for transmitting electrical signals between said second electro-optical transducer and said signal using control means, said electrical transmission means including a slip ring mounted to the cable-slack take-up drum and an electrically conductive brush engaging said slip ring and operatively connected to said signal using control means, said second electro-optical transducer being mounted to said drum and electrically coupled to said slip ring.

2. The assembly defined in claim 1, further comprising additional signal producing control means on said mobile component for generating additional electrical signals containing encoded information, stationary additional signal using control means for receiving and responding to information coded in said additional electrical signals, third signal transforming means including a third electro-optical transducer mounted to said drum and electrically linked to said additional signal producing control means for converting said additional electrical signals into additional optical signals, fourth signal transforming means including a fourth electro-optical transducer for converting said additional optical signals back into electrical signals, additional optical transmission means including an additional optical fiber extending longitudinally through the insulating sheath of said cable for carrying said additional optical signals from said third signal transforming means to said fourth signal transforming means, and additional electrical transmission means for transmitting electrical signals from said additional signal producing control means to said third electro-optical transducer, said additional optical fiber having an input end engaging said third electro-optical transducer and an output end engaging said fourth electro-optical transducer, said additional electrical transmission means including an additional slip ring mounted to said drum and an additional electrically conductive brush engaging said additional slip ring, said additional signal producing control means being electrically coupled to said additional slip ring via said additional electrically conductive brush.

3. The assembly defined in claim 1 wherein said first electro-optical transducer is a light emitting gallium arsenide diode.

4. The assembly defined in claim 1 wherein said first electro-optical transducer is a laser diode.

5. The assembly defined in claim 1 wherein said second electro-optical transducer is an avalanche diode.

6. The assembly defined in claim 1 wherein said second electro-optical transducer is a pin diode.

* * * * *